United States Patent [19]

Hosoi et al.

[11] Patent Number: 4,923,766
[45] Date of Patent: May 8, 1990

[54] PROCESS FOR PREPARING MAGNETIC RECORDING

[75] Inventors: Nobuyuki Hosoi, Kawasaki; Shigeru Hashimoto, Yokohama; Hiroshi Yoshida, Kawasaki; Yukio Watanabe, Machida; Yasuo Mukai, Yokohama; Michiko Yamamoto, Yamato, all of Japan

[73] Assignee: Canon Kabushiki Kaisha, Tokyo, Japan

[21] Appl. No.: 329,314

[22] Filed: Mar. 27, 1989

[30] Foreign Application Priority Data

Mar. 29, 1988 [JP] Japan .................................. 63-73365
Mar. 30, 1988 [JP] Japan .................................. 63-74483

[51] Int. Cl.⁵ .............................................. G11B 5/66
[52] U.S. Cl. ..................................... 428/694; 427/48; 427/128; 427/299; 428/900
[58] Field of Search ......................... 427/48, 128, 299; 428/694, 900

Primary Examiner—Bernard Pianalto
Attorney, Agent, or Firm—Fitzpatrick, Cella, Harper & Scinto

[57] ABSTRACT

A process for preparing a magnetic recording medium by coating a magnetic coating material on a non-magnetic support and then drying the above magnetic coating material, which comprises imparting a magnetic field to said magnetic coating material with a magnet which rotates with the rotational surface at an angle of 5° to 30° relative to the surface of said support prior to drying of said magnetic coating material on said support.

8 Claims, 2 Drawing Sheets

PROCESS FOR PREPARING MAGNETIC RECORDING

BACKGROUND OF THE INVENTION

1. Field of the Invention

This invention relates a process for preparing a coating type magnetic recording medium suitable for high density recording.

2. Related Background Art

In recent years, as the recording medium for computer, word processor, electronic still camera, etc., a disc-shaped flexible recording medium has been used. In such disc-shaped flexible magnetic recording medium, since reading and writing of recording are effected by sliding of a magnetic head in the circumferential direction (concentric shape) of the magnetic suface, if the magnetic particles are oriented in one direction as in magnetic tape, difference occurs between the reproduction output in the oriented direction and the reproduction output in the direction perpendicular to the oriented direction, which appears as the output fluctuation (modulation). Accordingly, in the disc-shaped magnetic recording medium used for a magnetic disc device, the magnetic particles must be randomly oriented (namely non-oriented) within the magnetic recording layer plane.

However, in preparing a coating type flexible magnetic recording medium, since a support carrying a magnetic coating material is passed between two rotatory rollers having a gap slightly broader than the thickness of the support formed therebetween, the magnetic particles are oriented in the running direction of the support. This is called the mechanical orientation. The magnetic recording medium subjected to the mechanical orientation will generate the modulation as mentioned above. Generally speaking, magnetic particles with greater shape anisotropy, namely with greater axis ratio are susceptible to mechanical orientation.

For inhibiting such modulation, it has been considered to employ a method to make the magnetic particles non-oriented by giving a magnetic field to the magnetic recording layer before the magnetic recording layer on the support is dried. For example, there have been known various methods as follows:

(a) the method in which the magnetic field is minutely varied with fine magnets arranged as directed toward various directions (Japanese Patent Publications Nos. 60-11370, 59-23010, Japanese Patent Laid-open Applications Nos. 59-18838 and 61-160825);

(b) the method in which several magnets are arranged at the upper portion and the lower portion with the support sandwiched therebetween (Japanese Patent Publication No. 45-21547, Japanese Patent Laid-open Application No. 54-149607);

(c) the method in which a magnetic field is applied in the width direction of the support (Japanese Patent Laid-open Applications Nos. 58-215731, 59-203243);

(d) the method in which a rotatory magnet which rotates with the rotation surface parallel to the support surface (Japanese Patent Laid-open Application No. 57-186232), etc.

However, in all of the above prior arts, it has been difficult to randomize sufficiently the ferromagnetic particles with great coercive force as used in a disc-shaped recording medium suitable for high density recording. Thus, even with the magnetic line of force applied for randomization, because of having itself inherent directionality, no sufficient randomization could be accomplished ((a), (b), (c)).

On the other hand, in the method (d) wherein the magnet is rotated so that the rotation surface may become in parallel to the support surface in order to remove inherent directionality of the magnetic line of force, there has been involved the problem that the surface roughness of the magnetic recording layer is worsened.

SUMMARY OF THE INVENTION

An object of the present invention is to provide a process for preparing a magnetic recording medium, which can improve the step of randomizing the magnetic particles in a magnetic recording layer, can sufficiently effect randomization even of ferromagnetic particles and can prepare a magnetic recording medium with little generation of output fluctuation.

The present invention is a process for preparing a magnetic recording medium by coating a magnetic coating material on a non-magnetic support and then drying the above magnetic coating material, which comprises imparting a magnetic field to said magnetic coating material with a magnet which rotates with the rotational surface at an angle of 5° to 30° relative to the surface of said support prior to drying of said magnetic coating material on said support.

DETAILED DESCRIPTION OF THE INVENTION

Figure 1:
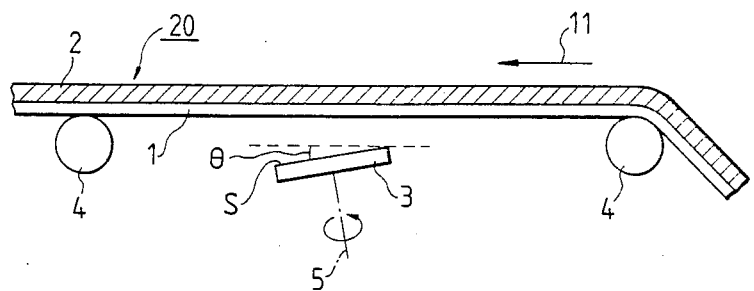
FIG. 1 is a side view showing an example of the device for practicing the preparation process of the present invention.

As shown in FIG. 1, the magnetic recording medium 20 is prepared by coating a magnetic coating material 2 on a non-magnetic support. The magnetic coating material 2 is dried during the course when the magnetic recording medium 20 is conveyed in the arrowhead direction 11 by conveying rollers 4 to become a magnetic recording layer. The magnetic coating material 2 is composed of ferromagnetic particles shaped in needles dispersed in a binder.

Now, in the present invention, before drying of the magnetic coating material 2, a magnetic field with a rotating magnet is imparted to the magnetic coating material 2. By this treatment, orientation of the ferromagnetic particles in the magnetic coating 2 can be disturbed to form a state without order (hereinafter called randomization treatment).

As shown in FIG. 1, the angle $\theta$ between the rotation surface S of the rotating magnet 3 and the support 1 is made 5° to 30°, further 10° to 20°. The angle $\theta$ is important for randomizing magnetic particles. If the angle $\theta$ is less than 5°, the surface of the magnetic recording layer will become undesirably rough. This may be considered to be due to the fact that the magnetic coating material surface is disturbed as the result of abrupt application of a strong magnetic field on the magnetic coating material. On the other hand, if the angle $\theta$ is greater than 30°, it is also not effective because the magnetic lines of force cannot exert sufficient action on the magnetic coating material. It is also preferable that the slanting of the rotatory magnet 3 should be in the direction such that the rotation surface S can be seen from the downstream side of the conveying direction of the magnetic recording medium 20.

The number of rotation of the rotatory magnet 3 is required to be more rapid rotational number when ferromagnetic particles with high coercive force are employed, but preferable results may be obtained at a rotational number of 50 rpm or more.

In FIG. 1, the rotatory magnet 3 is arranged on the support 1 side of the magnetic recording medium, but it may be also arranged on the magnetic coating material 2 side. When the rotatory magnet 3 is arranged on the magnetic coating material 2 side, in order to remove disturbance of the surface of the magnetic coating material 2 by the air stream (wind) generated by rotation of the magnet 3, a thin plate may be also provided between the magnetic recording medium 20 and the magnet 3. Also, on the same side of the magnetic recording medium 20, a plurality of rotatory magnets 3 may be provided.

Figure 2:
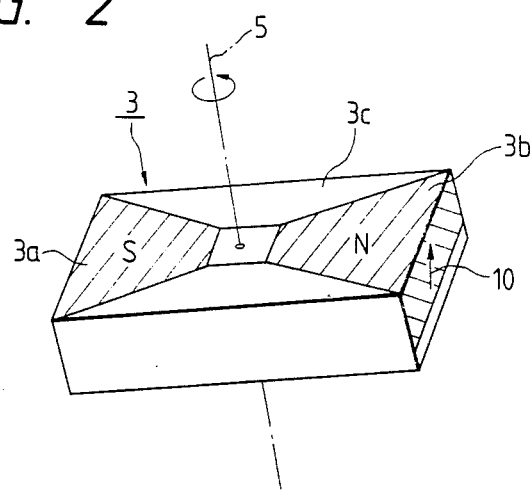
FIG. 2 is a perspective view showing an example of the rotatory magnet used in the device shown in FIG. 1.

The rotatory magnet 3 shown in FIG. 2 is one used practically by the present inventor, which is constituted so that the magnets 3a and 3b may be rotated with the rotational axis 5 as the center, but a magnet with any desired shape such as rod, disc, polygon, etc. may be used, provided that both of N-pole and S-pole appear on the rotation surface S. In the rotatory magnet 3 shown in FIG. 2, magnets 3a and 3b are fixed on a non-magnetic implement 9. The magnetization direction of the magnet 3b is shown by the arrowhead 10.

The magnetic recording medium subjected to the randomization treatment can be subsequently formed into a disc-shaped magnetic recording medium according to conventional method.

Figure 3:
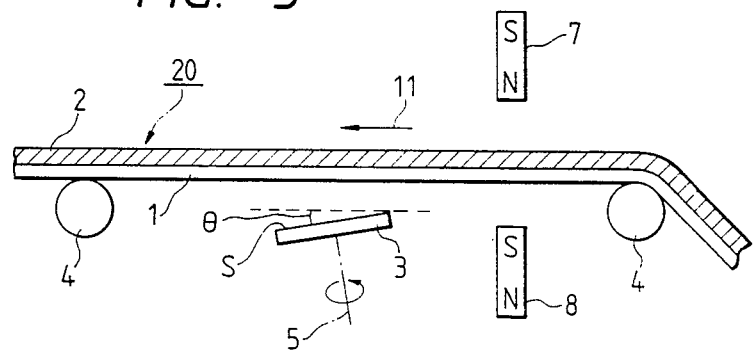
FIG. 3 is a side view showing another example of the preparation process of the present invention.

The preparation process of the present invention, as shown in FIG. 3, may be also devised to effect preliminary orientation prior to imparting the magnetic field with the rotatory magnet 3 to the magnetic recording medium 20, with a pair of magnets 7 and 8 for vertical orientation being arranged on the upstream side of the magnetic recording medium conveying direction of the rotatory magnet 3.

In this case, the magnets 7 and 8 for vertical orientation are arranged so that the N-pole and the S-pole may be arranged on the upper portion and the lower portion of the magnetic recording medium 20 as opposed to each other with the magnetic recording medium 20 sandwiched therebetween. By these magnets 7 and 8 for vertical orientation, a magnetic field is given so that the magnetic lines of force may pass from the back surface to the front surface or from the front surface to the back surface of the magnetic recording medium 20, whereby preliminary orientation is effected in the vertical direction.

By such preliminary orientation, the long axis direction of magnetic particle stands up in the direction perpendicular to the surface of the support 1, whereby mechanical orientation is removed. For this reason, the randomization treatment with the rotatory magnet 3 can be effected under the state without mechanical orientation, whereby the magnetic particles can be made efficiently under disorderly state. As a pair of the magnets 7 and 8 for vertical orientation for effecting preliminary orientation in the vertical direction, either of permanent magnets and electromagnets may be available.

The preparation process of the present invention is particularly effective for the preparation process of the magnetic recording medium by use of ferromagnetic particles with a coercive force (Hc) of 1400 Oe or higher.

As the binder, ferromagnetic particles, and others constituting the magnetic coating material 2, those known in the art can be used.

For example, as the binder, vinyl chloride-vinyl acetate copolymer, vinyl chloride-acrylonitrile copolymer, acrylic acid ester-acrylonitrile copolymer, acrylic acid ester-vinylidene chloride copolymer, and other copolymers with acrylic acid, urethane elastomer, etc. can be used.

As the ferromagnetic particles, for example, $\gamma\text{-Fe}_2\text{O}_3$, $\text{Fe}_3\text{O}_4$, $\gamma\text{-Fe}_2\text{O}_3$ and $\text{Fe}_3\text{O}_4$ doped with Co, $\text{CrO}_2$, Fe-Ni-Si alloy, etc. can be used.

As the support 1, those known in the art such as polyethyleneterephthalate, etc. may be available.

The present invention is described in more detail below by referring to Examples.

EXAMPLES, COMPARATIVE EXAMPLES

Metal magnetic powder (Fe-Ni-Si alloy, long axis 0.25 $\mu$m, axis ratio: 8)
  100 parts by weight
Vinyl chloride-vinyl acetate-vinyl alcohol copolymer (polymerized molar ratio=91/3/6)
  10 parts by weight
polyurethane elastomer
  10 parts by weight
$\alpha\text{-Al}_2\text{O}_3$ (abrasive, particle size 0.4 $\mu$m)
  5 parts by weight
Dispersing agent (RE-610, manufactured by Toho Kagaku K.K.)
  2 parts by weight
Solvent (methyl ethyl ketone, toluene, each 120 parts by weight)
  240 parts by weight.

The above compositions was mixed and dispersed in a sand grinder, 5 parts by weight of Coronate L (manufactured by Nippon Polyurethane Kogyo K.K.) were added to the dispersion and uniformly mixed to obtain a magnetic coting material. This was coated on a polyester film (thickness 33 $\mu$m), and immediately after smoothening of the surface by a smoother (final thickness 4 $\mu$m), randomization treatment was applied by use of a device shown in FIG. 1 (conveying speed of magnetic recording medium: 20 m/min.) and a magnetic shown in FIG. 2 (applied magnetic field at the shortest distance from the support: 3K öe, $80 \times 160 \times 50$ mm), and then calendering treatment, heat curing treatment (50° C., 20 hours) were performed, followed by punching into a desired diameter (47 mm$\phi$) to obtain a disc-shaped magnetic recording medium.

As for metal magnetic powders, three kinds with coercive forces of 1450 öe, 1550 öe, 1650 öe were used. Also, preparation of the magnetic recording medium was performed by varying the slanting angle $\theta$, the rotational number, and the number of rotatory magnet 3.

For each of the magnetic recording media thus prepared, recording and reproduction were performed with signals of 7 MHz, and modulation was measured from the envelope obtained. Also, for each magnetic recording medium, the surface roughness Ra of the magnetic recording layer was measured by use of a contact needle type surface roughness meter. The measurement results are shown in Table 1. Measurement was conducted for 28 kinds of magnetic recording media prepared by varying the operating conditions of the rotatory magnet or the kind of magnetic particles.

In the Table, → denotes the same value as the left adjacent numerical value. The magnetic recording medium used in measurement of No. 1 is prepared without passing through the magnetic field with the rotatory magnet 3. When one rotatory magnets 3 was used, the rotatory magnet 3 was located on the support side of the magnetic recording medium, while two rotatory magnets 3 were used, the rotatory magnets 3 were located on both sides of the magnetic recording layer medium and the support side of the magnetic recording medium, and a nonmagnetic metal thin plate was provided between the magnetic recording layer and the rotatory magnet 3.

Figure 4:
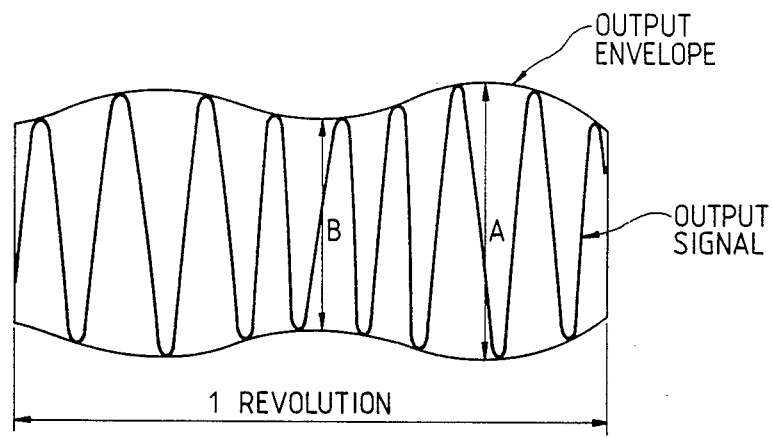
FIG. 4 is a graph showing an example of output envelope.

In the present invention, the term "modulation" is defined by the expression "$(A-B)/(A+B)\times 100$", where A denotes the maximum output level per one revolution and B denotes the minimum output level per one revolution, as shown in FIG. 4.

Further, the term "envelope" means another wave composed of the instantaneous peak values of the original wave of an alternating quantity, as described in page 318 of "IEEE Standard Dictionary of Electrical and Electronics terms".

Figure 5:
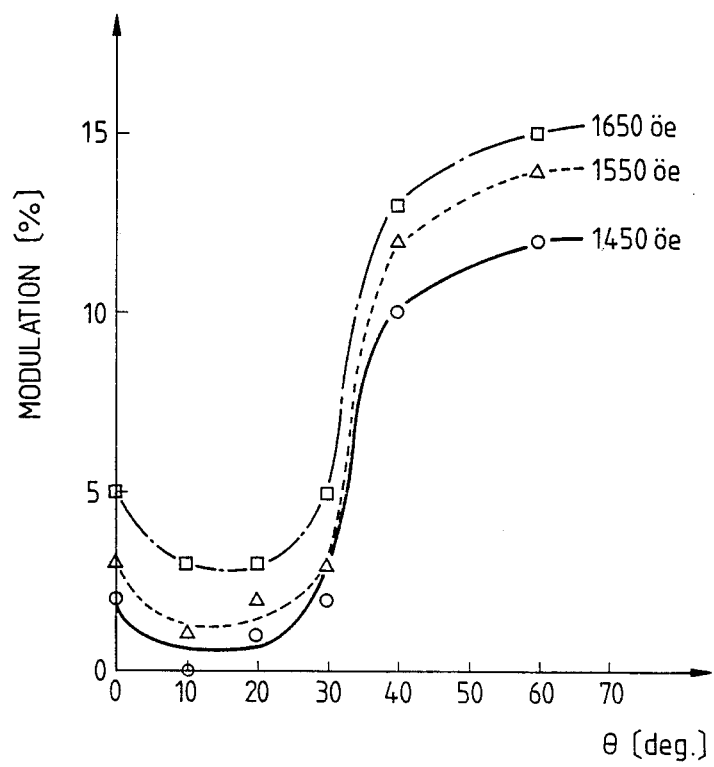
FIG. 5 is a graph showing the change in modulation.

The measurement results of No. 1 to 20 are shown as a graph in FIG. 5.

In the present invention, Ra indicates the center line average roughness (JIS B0601), which is represented in $\mu m$ unit of the value given by the following formula, when the portion of the measured length L is drawn out from the surface roughness curve in its center line direction, and the surface roughness curve is represented by $Y=f(X)$ with the center line of the drawn out portion as the X-axis:

$$Ra = \frac{1}{L} \int_0^L \{f(x)\}dx$$

As described above, according to the present invention, a magnetic recording medium excellent in magnetic characteristics with small output fluctuation can be obtained.

What is claimed is:

1. A process for preparing a magnetic recording medium by coating a magnetic coating material on a nonmagnetic support and then drying the above magnetic coating material, which comprises imparting a magnetic field to said magnetic coating material with a magnet which rotates with the rotational surface at an angle of 5° to 30° relative to the surface of said support prior to drying of said magnetic coating material on said support.

2. A process according to claim 1, wherein said angle is 10° to 20°.

3. A process according to claim 1, wherein said rotatory magnet is arranged on said support side of said magnetic medium.

TABLE 1

| | No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Magnetic particles Hc(Oe) | 1450 | → | → | → | → | → | → | → | 1550 | → | → | → | → | → |
| Rotatory magnet | | | | | | | | | | | | | | |
| Slanting angle θ (deg) | — | 0 | 0 | 10 | 20 | 30 | 40 | 60 | 0 | 10 | 20 | 30 | 40 | 60 |
| Rotational number (rpm) | — | 0 | 50 | → | → | → | → | → | → | → | → | → | → | → |
| Number | — | 1 | → | → | → | → | → | → | → | → | → | → | → | → |
| Modulation (%) | 8 | 14 | 2 | 0 | 1 | 2 | 10 | 12 | 3 | 1 | 2 | 3 | 12 | 14 |
| Surface roughness Ra (μm) | 0.022 | 0.058 | 0.047 | 0.021 | 0.019 | 0.023 | 0.022 | 0.024 | 0.040 | 0.019 | 0.020 | 0.020 | 0.021 | 0.023 |

| | No. | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Magnetic particles Hc(Oe) | 1650 | → | → | → | → | → | 1450 | → | 1550 | → | 1650 | → | → | → |
| Rotatory magnet | | | | | | | | | | | | | | |
| Slanting angle θ (deg) | 0 | 10 | 20 | 30 | 40 | 60 | 10 | 20 | 0 | 20 | 0 | 20 | → | → |
| Rotational number (rpm) | 50 | → | → | → | → | → | 100 | 50 | → | → | → | → | 100 | 200 |
| Number | 1 | → | → | → | → | → | → | 2 | → | → | → | → | 1 | 2 |
| Modulation (%) | 5 | 3 | 3 | 5 | 13 | 15 | 1 | 0 | 2 | 0 | 3 | 1 | 1 | 0 |
| Surface roughness Ra (μm) | 0.035 | 0.024 | 0.022 | 0.022 | 0.021 | 0.024 | 0.023 | 0.023 | 0.042 | 0.027 | 0.038 | 0.026 | 0.023 | 0.025 |

As is apparent from Table 1 and FIG. 5, preferable results were obtained at a slanting angle of the rotatory magnet 3 between 5° and 30°. When the slanting angle θ is 0° (No. 2, 3, 9, 15, 23, 25), all of the surface roughness Ra of the magnetic recording layer were undesirably bad as 0.035 μm or more.

4. A process according to claim 1, wherein said rotatory magnet is arranged on said magnetic recording layer side of said magnetic medium.

5. A process according to claim 4, wherein a thin plate is provided between said magnetic recording layer and said rotatory magnet.

6. A process according to claim 1, wherein said rotatory magnet is arranged on both of said support side and said magnetic recording layer side of said magnetic recording medium.

7. A process according to claim 1, wherein preliminary orientation in the direction perpendicular to said support surface is applied to the magnetic coating material on said support before imparting magnetic field with said rotatory magnet.

8. A magnetic recording medium produced by the process of claim 1, by use of ferromagnetic particles with a coercive force of 1400 öe or higher.

* * * * *

UNITED STATES PATENT AND TRADEMARK OFFICE
CERTIFICATE OF CORRECTION

PATENT NO. : 4,923,766
DATED : May 8, 1990
INVENTOR(S) : NOBUYUKI HOSOI ET AL.   Page 1 of 2

It is certified that error appears in the above-identified patent and that said Letters Patent is hereby corrected as shown below:

AT [54] TITLE

"RECORDING" should read --RECORDING MEDIUM--.

COLUMN 1

Line 3, "RECORDING" should read --RECORDING MEDIUM--.
Line 50, "61-160825);" should read --61-160835);--.

COLUMN 2

Line 62, "further" should read --preferably--.

COLUMN 3

Line 27, "inventor," should read --inventors,--.
Line 51, "as" should be deleted.
Line 61, "particle stands up" should read --particles stand--.

COLUMN 4

Line 7, "1400 Oe" should read --1400 öe--.
Line 33, "polyurethane elastomer" should read --Polyurethane elastomer--.
Line 47, "coting" should read --coating--.
Line 49, "smoothening" should read --smoothing--.
Line 52, "magnetic" should read --magnet--.

UNITED STATES PATENT AND TRADEMARK OFFICE
CERTIFICATE OF CORRECTION

PATENT NO. : 4,923,766
DATED : May 8, 1990
INVENTOR(S) : NOBUYUKI HOSOI ET AL.

Page 2 of 2

It is certified that error appears in the above-identified patent and that said Letters Patent is hereby corrected as shown below:

COLUMN 5

Line 12, "magnets" should read --magnet--.
    Line 14, "while" should read --while then--.
    Line 30, "terms"." should read --Terms".--.
    Table 1, "particles Hc(Oe) should read
            --particles Hc(öe)--.
    Line 67, "were" should read --was--.

COLUMN 8

Line 1, "magnetic field" should read
        --said magnetic field--.

Signed and Sealed this

Eighteenth Day of June, 1991

Attest:

HARRY F. MANBECK, JR.

*Attesting Officer*        *Commissioner of Patents and Trademarks*